United States Patent
Huang et al.

(10) Patent No.: US 10,169,908 B2
(45) Date of Patent: Jan. 1, 2019

(54) METHOD, APPARATUS, STORAGE MEDIUM AND DEVICE FOR CONTROLLED SYNTHESIS OF INHOMOGENEOUS TEXTURES

(71) Applicant: Shenzhen University, Shenzhen, Guangdong Province (CN)

(72) Inventors: Hui Huang, Shenzhen (CN); Yang Zhou, Shenzhen (CN); Huajie Shi, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 15/604,696

(22) Filed: May 25, 2017

(65) Prior Publication Data
US 2018/0144490 A1    May 24, 2018

(30) Foreign Application Priority Data
Nov. 23, 2016  (CN) .......................... 2016 1 1046599

(51) Int. Cl.
*G06T 15/04* (2011.01)
*G06T 11/00* (2006.01)

(52) U.S. Cl.
CPC ............ *G06T 15/04* (2013.01); *G06T 11/001* (2013.01)

(58) Field of Classification Search
CPC ......... G06T 11/001; G06T 15/04; G06T 7/40; G06T 7/44; G06T 11/40
See application file for complete search history.

(56) References Cited

U.S. PATENT DOCUMENTS

| | | | | |
|---|---|---|---|---|
| 7,110,000 B2* | 9/2006 | Zhang | .................. | G06T 11/001 345/428 |
| 2003/0206176 A1* | 11/2003 | Ritter | .................. | G06T 11/001 345/582 |
| 2012/0173199 A1* | 7/2012 | Herzenberg | ............ | G06F 17/18 702/181 |
| 2015/0254840 A1* | 9/2015 | Madabhushi | ......... | G06T 7/0012 382/131 |

* cited by examiner

Primary Examiner — Antonio A Caschera
(74) Attorney, Agent, or Firm — Harness, Dickey & Pierce, P.L.C.

(57) ABSTRACT

The present invention provides a method, apparatus, storage medium and device for controlled synthesis of inhomogeneous textures, which relates to the field of texture synthesis technique in image processing. The method includes: obtaining an input texture exemplar from user, and analyzing the features of the exemplar, so as to extract the source guidance channels; herein the guidance channels comprise a progression map and an orientation field of the texture exemplar; obtaining a progression map and an orientation field from the user specified target, which are used as the target guidance channels; comparing the differences between the source guidance channels and the target guidance channels, so as to form the progression constraint and orientation constraint; determining the distance measure between the texture exemplar and target image, and adding the progression constraint and orientation constraint into the distance measure; the target image produced by minimizing the sum of distances over all patches with the constrained distance measure, is the final output of controlled synthesis.

14 Claims, 9 Drawing Sheets

METHOD, APPARATUS, STORAGE MEDIUM AND DEVICE FOR CONTROLLED SYNTHESIS OF INHOMOGENEOUS TEXTURES

TECHNICAL FIELD

The present invention relates to the field of texture synthesis technique in image processing, and specifically to a method, apparatus, storage medium and device for controlled synthesis of inhomogeneous textures.

BACKGROUND

Figure 1:
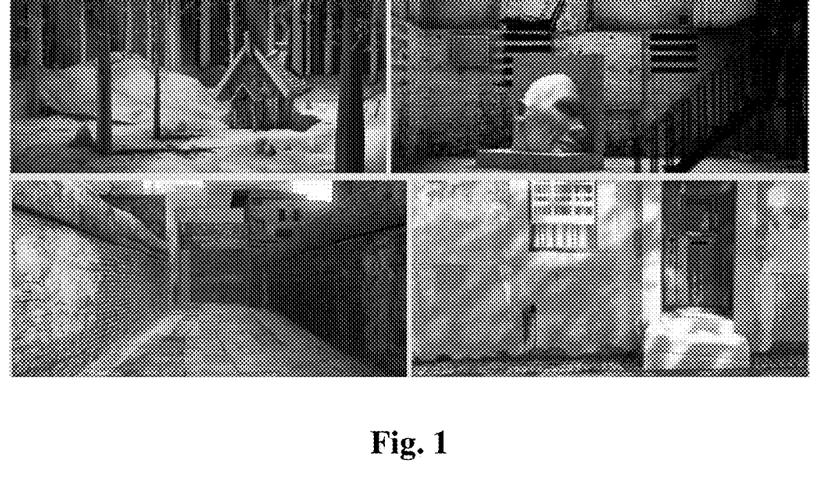
FIG. 1 is a schematic representation of some typical applications of texture synthesis in the prior art.
Figure 2:
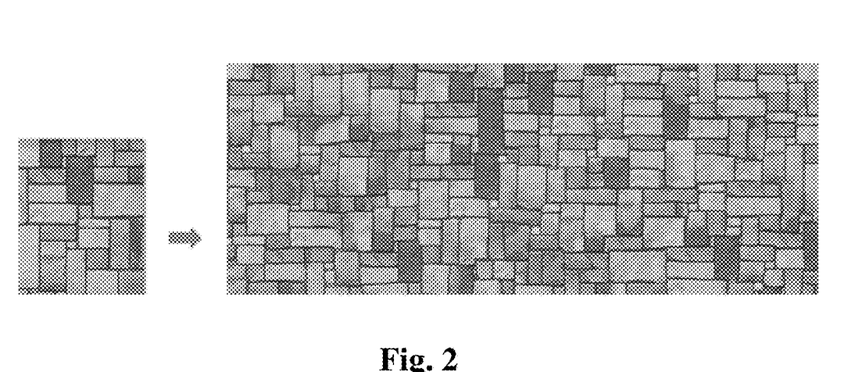
FIG. 2 is a schematic representation of exemplar-based texture synthesis in the prior art.

Currently, texture synthesis is one of the fundamental problems in computer graphics. In general, the fundamental goal of texture synthesis is to generate textures that meet the requirements of people. Texture synthesis has a wide range of applications (as the typical applications shown in FIG. 1) across photorealistic and non-photorealistic rendering, as well as image restoring, artistic style transfer, network fast transmission of compressed data and computer animation etc. Texture synthesis technique has two families of methods: procedural methods based on parameterized procedures and exemplar-based non-parametric methods. Procedural methods usually have complicated non-intuitive parameters, therefore current work generally lies in the family of exemplar-based texture synthesis. A typical exemplar-based texture synthesis (as shown in FIG. 2) is to synthesize a large texture image from a limited size input exemplar.

Figure 3:
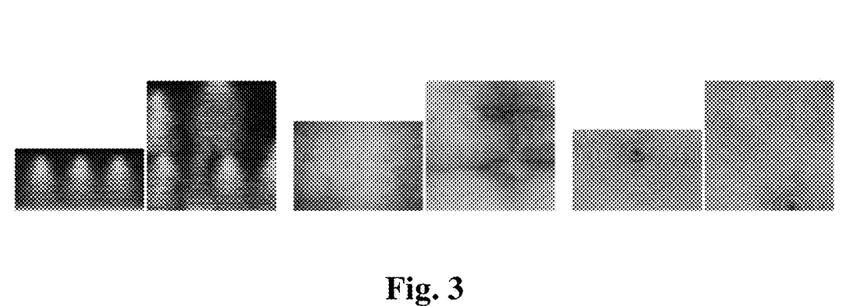
FIG. 3 is a schematic representation of using self-tuning texture synthesis method for inhomogeneous and anisotropic textures in the prior art.

During the past two decades, there has been tremendous progress in example-based texture synthesis methods. Most of these methods inherently assume that the input exemplar textures are homogeneous or stationary. However, many surfaces in the real world are, in fact, inhomogeneous, and contain some form of spatial variation that manifests itself in perceptible changes in color, lighting, pattern, and the size and orientation of texture elements, which may gradually evolve across the spatial extent of the exemplar. Such spatially variant behaviors are referred as progressions in the present invention. As demonstrated in FIG. 3, most existing synthesis methods operate in a local fashion and are therefore not well equipped to automatically handle these more global phenomena. Furthermore, texture artists, the intended users of texture synthesis, are rarely interested in merely synthesizing a larger texture from an exemplar; rather, their typical goal is to produce textures intended for specific 3D models, which requires good control over the synthesized result. However, example-based texture synthesis methods often lack simple and intuitive means of user control. In consequence, some attention has been paid over the years to controlling the synthesis of inhomogeneous textures.

A common way to add control to existing methods is by providing manually created feature or guidance channels both for the exemplar and the output texture. The guidance channels dictate, in a "texture-by-numbers" style, where specific content from the exemplar should be placed in the output texture. The manual nature of this workflow is tedious, especially when attempting to annotate continuous progressions. The recent self-tuning texture optimization approach automatically computes a guidance channel, however, it is designed to help preserve large scale structures, such as curve-like features, rather than to control gradual spatial changes. Thus, there's still lack of a method for controlled synthesis of inhomogeneous textures.

SUMMARY OF THE DISCLOSURE

The present invention provides a method, apparatus, storage medium and device for controlled synthesis of inhomogeneous textures, to solve the issue that there's still lack of a method for controlled synthesis of inhomogeneous textures among existing techniques.

To achieve the above goal, the present invention adopts the following technical scheme:

A method for controlled synthesis of inhomogeneous textures, comprising:

Obtaining an input texture exemplar from user, and analyzing the features of the exemplar, so as to extract the source guidance channels; herein the guidance channels comprise a progression map and an orientation field of the texture exemplar;

Obtaining a progression map and an orientation field from the user specified target, which are used as the target guidance channels;

Comparing the differences between the source guidance channels and the target guidance channels, so as to form the progression constraint and orientation constraint;

Determining the distance measure between the texture exemplar and target image, and adding the progression constraint and orientation constraint into the distance measure;

The target image produced by minimizing the sum of distances over all patches with the constrained distance measure, is the final output of controlled synthesis.

Specifically, analyzing the features of the exemplar, so as to extract the source guidance channels, comprising:

Analyzing the features of the texture exemplar, so as to extract a progression map;

Analyzing the features of the texture exemplar, so as to extract a progression map, comprising:

Down-sampling the texture exemplar with a default sampling interval and a default sampling window, and computing a feature vector inside each default sampling window;

Constructing a distance matrix M; herein the distance matrix M is composed of all the elements $m_{ij}$, and each element $m_{ij}$ represents the sum of EMD distance between the histograms of any two feature vectors extracted above;

Based on the distance matrix M described above, employing Isomap method to obtain the coordinate value on one dimensional manifold for each feature vector, and normalizing it.

Constructing a scalar map; wherein each pixel in the scalar map is corresponding to each point in the down-sampling, and the value at each pixel is the normalized coordinate value of the feature vector.

Up-sampling the scalar map described above to full resolution, which forms a full resolution scalar map used as the progression channel.

Specifically, analyzing the features of the texture exemplar, so as to extract an orientation field, comprising:

Analyzing the features of the texture exemplar, so as to extract an orientation field;

Analyzing the features of the texture exemplar, so as to extract an orientation field, comprising:

Dividing the texture exemplar into non-overlapping patches with default size;

Computing the feature descriptor of histogram of oriented gradients for each non-overlapping texture patch;

Converting the feature descriptor of histogram of oriented gradients into a set of orientation vectors; and Applying PCA dimensionality reduction method to obtain a dominant vector field from the orientation vectors described above, such that the dominant vector field is used as the orientation field of the texture exemplar; wherein the dominant vector refers to the eigen vector corresponding to the largest eigen value.

Specifically, the progression constraint refers to the similarity in progression channel; the orientation constraint refers to the similarity in orientation filed; Comparing the differences between the source guidance channels and the target guidance channels, so as to form the progression constraint and orientation constraint, comprising:

Determining the similarity $d_p(t_i,s_i)$ in progression channel described above according to formula $d_p(t_i,s_i)=\|p(t_i)-p(s_i)\|_1$; wherein $t_i$ is a patch with default size in target image; $s_i$ is the most similar patch in texture exemplar corresponding to $t_i$; $p(t_i)$ is the unfolded vector in progression channel of patch $t_i$; $p(s_i)$ is the unfolded vector in progression channel of patch $s_i$;

Determining the similarity $d_o(t_i,s_i)$ in orientation field described above according to formula $d_o(t_i,s_i)=\Sigma_{x\in s_i, y\in t_i}(1-|v_x \cdot v_y|)$; wherein $v_x$ and $v_y$ are the orientation vectors at pixel x in $s_i$ and pixel y in $t_i$ respectively.

Specifically, determining the distance measure between the texture exemplar and target image, and adding the progression constraint and orientation constraint into the distance measure, comprising:

Determining the distance measure $d(t_i,s_i)$ between patches after adding constraints according to formula $d(t_i,s_i)=\|t_i-s_i\|_2^2+\alpha(\beta d_p(t_i,s_i)+(1-\beta)d_o(t_i,s_i))$; wherein $\alpha$ is a default constraint weight; $\beta$ is a default adjusting weight.

Specifically, the target image produced by minimizing the sum of distances over all patches with the constrained distance measure, is the final output of controlled synthesis, comprising:

The target image produced by minimizing the sum of distances over all patches with the constrained distance measure according to function $T=\min_{\{t_i,s_j\}}\Sigma_{i\in T}d(t_i,s_i)$, is the final output of controlled synthesis.

Apparatus for controlled synthesis of inhomogeneous textures, comprising:

An element of obtaining source guidance channels, which is to obtain an input texture exemplar from user, analyze the features of the exemplar and extract source guidance channels; herein the guidance channels comprise a progression map and an orientation field of the texture exemplar;

An element of obtaining target guidance channels, which is to obtain a progression map and an orientation field from the user specified target, and the progression map and the orientation field are used as target guidance channels;

An element of forming constraints, which is to compare the differences between the source guidance channels and the target guidance channels, forming the progression constraint and orientation constraint;

An element of determining distance measure, which is to determine the distance measure between the texture exemplar and target image, and the progression constraint and orientation constraint are added into the distance measure;

An element of producing the output controlled synthesis, which is to produce a target image by minimizing the sum of distances over all patches with the constrained distance measure, wherein the target image is the final output of controlled synthesis.

Furthermore, the described element of obtaining source guidance channels, includes a progression map extraction module for the texture exemplar, which is use for:

Analyzing the features of the texture exemplar, and extracting a progression map;

The described module of obtaining source progression channel, is specifically used for:

Down-sampling the texture exemplar with a default sampling interval and a default sampling window, and computing a feature vector inside each default sampling window;

Constructing a distance matrix M; herein the distance matrix M is composed of all the elements $m_{ij}$, and each element $m_{ij}$ represents the sum of EMD distance between the histograms of any two feature vectors extracted above.

Based on the distance matrix M described above, employing Isomap method to obtain the coordinate value on one dimensional manifold for each feature vector, and normalizing it;

Constructing a scalar map; wherein each pixel in the scalar map is corresponding to each point in the down-sampling, and the value at each pixel is the normalized coordinate value of the feature vector;

Up-sampling the scalar map described above to full resolution, which forms a full resolution scalar map using as the progression channel.

Furthermore, the described element of obtaining source guidance channels, includes an orientation field extraction module for the texture exemplar, which is use for:

Analyzing the features of the texture exemplar, so as to extract an orientation field;

The described module of obtaining source orientation field, is specifically used for:

Dividing the texture exemplar into non-overlapping patches with default size;

Computing the feature descriptor of histogram of oriented gradients for each non-overlapping texture patch;

Converting the feature descriptor of histogram of oriented gradients into a set of orientation vectors;

Applying PCA dimensionality reduction method to obtain a dominant vector field from the orientation vectors described above, and the dominant vector field is used as the orientation field of the texture exemplar; wherein the dominant vector refers to the eigen vector corresponding to the largest eigen value.

Furthermore, the element of determining distance measure element includes using the similarity in progression channel as progression constraint, and similarity in orientation field as the constraint in orientation field;

The described constraint element is specifically used for:

Determining the similarity $d_p(t_i,s_i)$ in progression channel described above according to formula $d_p(t_i,s_i)=p(t_i)-p(s_i)\|_1$; wherein $t_i$ is a patch with default size in target image; $s_i$ is the most similar patch in texture exemplar corresponding to $t_i$; $p(t_i)$ is the unfolded vector in progression channel of patch $t_i$; $p(s_i)$ is the unfolded vector in progression channel of patch $s_i$;

Determining the similarity $d_o(t_i,s_i)$ in orientation field described above according to formula $d_o(t_i,s_i)=\Sigma_{x\in s_i, y\in t_i}(1-|v_x \cdot v_y|)$; wherein $v_x$ and $v_y$ are the orientation vectors at pixel x in $s_i$ and pixel y in t respectively.

Furthermore, the described element of producing the controlled synthesis result, is specifically used for determining the distance measure between the texture exemplar and target image, and adding the progression constraint and orientation constraint into the distance measure, is specifically used for:

Determining the distance measure $d(t_i,s_i)$ between patches after adding constraints according to formula $d(t_i,s_i)=\|t_i-s_i\|_2^2+\alpha(\beta d_p(t_i,s_i)+(1-\beta)d_o(t_i,s_i))$; wherein $\alpha$ is a default constraint weight; $\beta$ is a default adjusting weight.

Furthermore, the described element of producing the output controlled synthesis is specifically used for:

Producing the target image by minimizing the sum of distances over all patches with the constrained distance measure according to function $T=\min_{\{t_i,s_j\}}\Sigma_{i\in T}d(t_i,s_i)$, which is the final output of controlled synthesis.

A computer-readable storage medium including computer readable instructions, the computer readable instructions are executed to enable the processor to perform at least one of the methods for controlled synthesis of inhomogeneous textures.

A device, which comprises a processor; and a memory including computer readable instructions, which enable the processor to execute the method for controlled synthesis of inhomogeneous textures, when executed.

The method, apparatus, storage medium and device for controlled synthesis of inhomogeneous textures provided by the embodiment of the invention, first obtains an input texture exemplar from user, and analyzes the features of the exemplar, so as to extract the source guidance channels; herein the guidance channels comprise a progression map and an orientation field of the texture exemplar; then obtains a progression map and an orientation field from the user specified target, which are used as the target guidance channels; by comparing the differences between the source guidance channels and the target guidance channels, it forms the progression constraint and orientation constraint; after determining the distance measure between the texture exemplar and target image, it adds the progression constraint and orientation constraint into the distance measure; and accordingly, the target image produced by minimizing the sum of distances over all patches with the constrained distance measure, is the final output of controlled synthesis. The embodiment of the invention improves the distance measure in texture optimization, which enables the control of the synthesis result through user provided target guidance channels. Therefore, the present invention overcomes the issue that there's still lack of a method for controlled synthesis of inhomogeneous textures.

BRIEF DESCRIPTIONS OF THE DRAWINGS

In order to illustrate more clearly with existing technology or technology in the embodiment of the present invention, the following will be the implementation of existing cases or the need to use the techniques described in the figure was briefly introduced, obviously, the figure is only described below in some embodiments of the present invention, for a person skilled in the art, in the premise of do not pay the creative work, you can also get other drawings according to these drawings.

DETAILED DESCRIPTIONS

The technical solutions in the embodiments of the present invention will be described in the following with reference to the accompanying drawings in the embodiments of the present invention. Obviously, the described embodiments are merely part of the present invention, and not all embodiments. All other embodiments obtained by those persons skilled in the art without making creative work are within the scope of the present invention, based on embodiments in the present invention.

Figure 4:
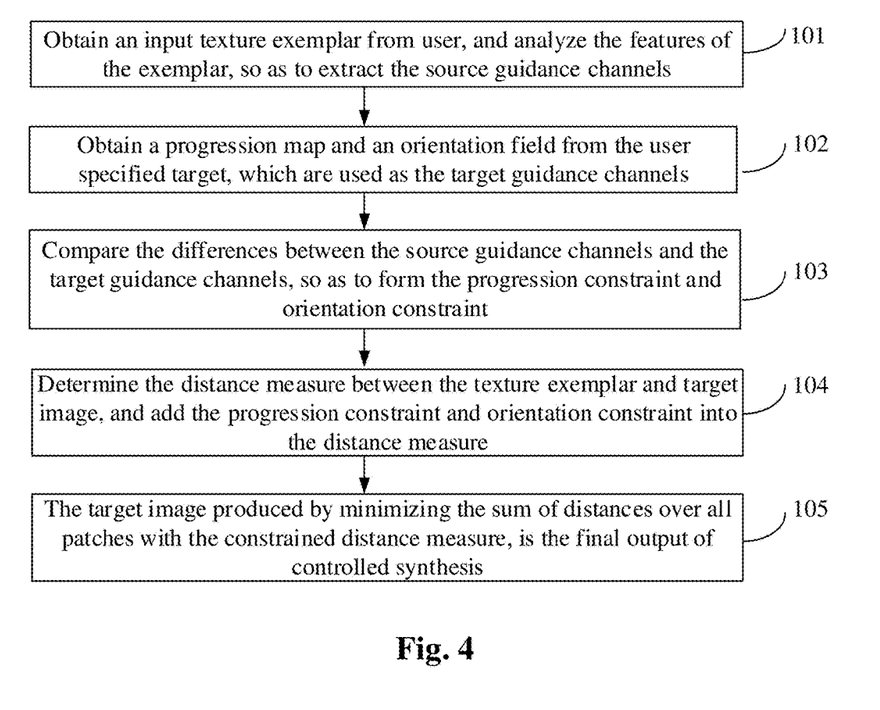
FIG. 4 is flow chart I of a method for controlled synthesis of inhomogeneous textures, in accordance with an embodiment of the present invention.

As shown in FIG. 4, the present invention provides a method for controlled synthesis of inhomogeneous textures, comprising:

Step 101, obtain an input texture exemplar from user, and analyze the features of the exemplar, so as to extract the source guidance channels.

Herein, the guidance channels comprise a progression map and an orientation field of the texture exemplar.

Step 102, obtain a progression map and an orientation field from the user specified target, which are used as the target guidance channels.

Step 103, compare the differences between the source guidance channels and the target guidance channels, so as to form the progression constraint and orientation constraint.

Step 104, determine the distance measure between the texture exemplar and target image, and add the progression constraint and orientation constraint into the distance measure.

Step 105, the target image produced by minimizing the sum of distances over all patches with the constrained distance measure, is the final output of controlled synthesis.

Figure 5:
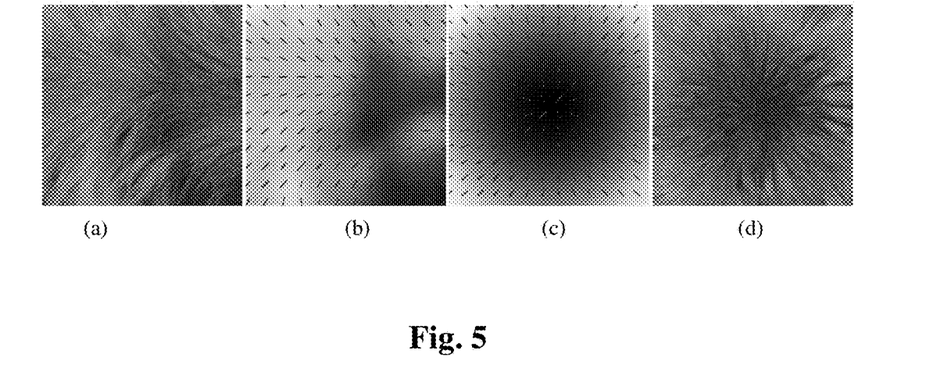
FIG. 5 contains the schematic representations of a texture exemplar (a), progression map and orientation field of the exemplar (b), target progression map and target orientation field (c), and the final output of controlled synthesis (d), in accordance with an embodiment of the present invention.

For example, as shown in FIG. 5, by the use of texture exemplar (a), and its progression map and orientation field (b), as well as the target progression map and target orientation field (c), the final output of controlled synthesis is shown in (d).

The method for controlled synthesis of inhomogeneous textures provided by the embodiment of the present invention, first obtains an input texture exemplar from user, and analyzes the features of the exemplar, so as to extract the source guidance channels; herein the guidance channels comprise a progression map and an orientation field of the texture exemplar; then obtains a progression map and an orientation field from the user specified target, which are used as the target guidance channels; by comparing the differences between the source guidance channels and the target guidance channels, it forms the progression constraint and orientation constraint; after determining the distance measure between the texture exemplar and target image, it adds the progression constraint and orientation constraint into the distance measure; and accordingly, the target image produced by minimizing the sum of distances over all patches with the constrained distance measure, is the final output of controlled synthesis. The embodiment of the invention improves the distance measure in texture optimization, which enables the control of the synthesis result through user provided target guidance channels. Therefore, the present invention overcomes the issue that there's still lack of a method for controlled synthesis of inhomogeneous textures.

Figure 6:
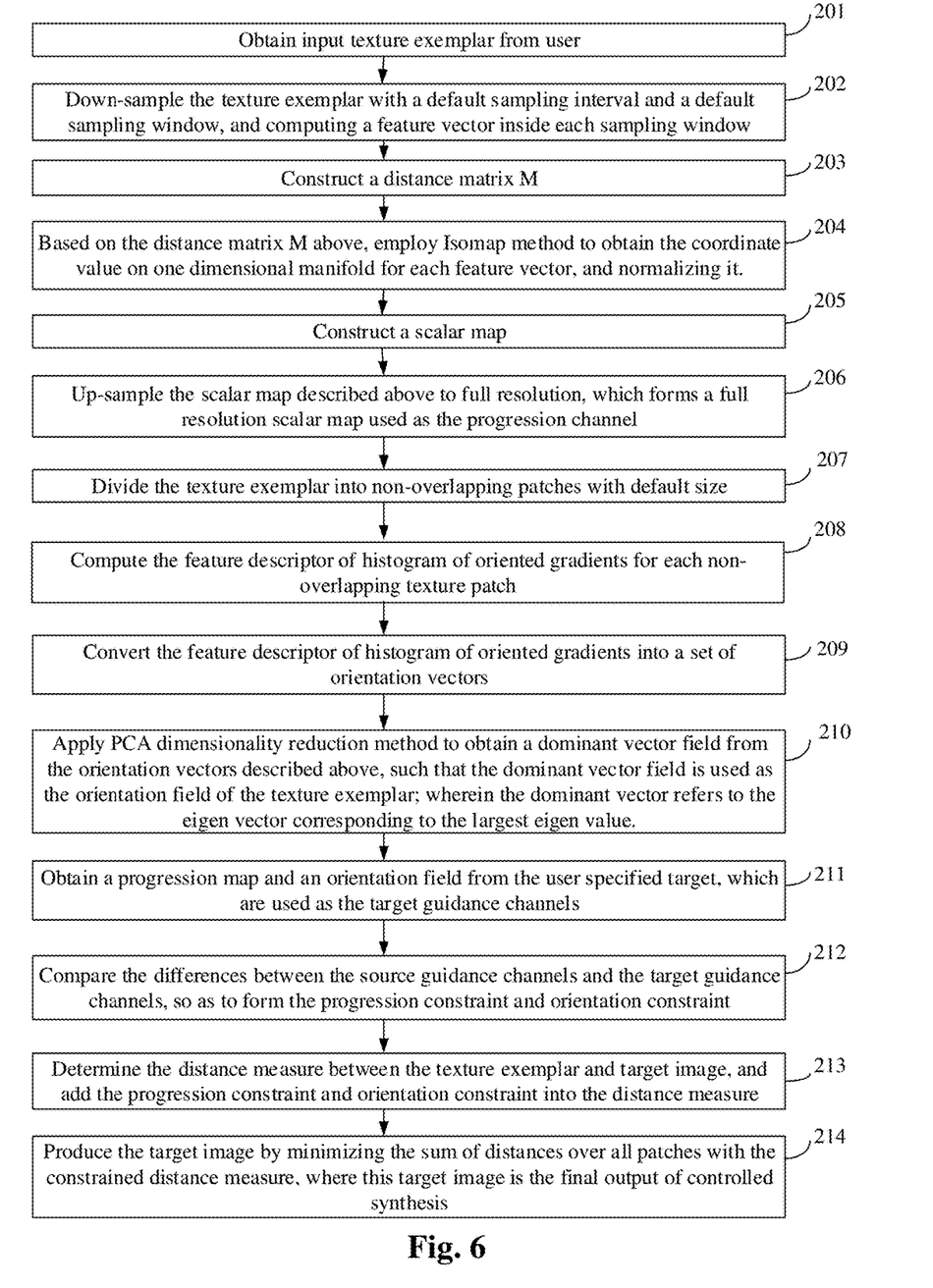
FIG. 6 is flow chart II of a method for controlled synthesis of inhomogeneous textures, in accordance with an embodiment of the present invention.

In order to provide a better understanding of the present invention by those skilled in the art, a more detailed example is given below. As shown in FIG. 6, the embodiment of the present invention provides a method for controlled synthesis of inhomogeneous textures, comprising:

Step 201, obtain input texture exemplar from user.

Step 202, down-sample the texture exemplar with a default sampling interval and a default sampling window, and computing a feature vector inside each default size sampling window.

Wherein, the default sampling interval can be set to 8 pixels, and the size of the default sampling window can be set to 48×48 pixels.

Step 203, construct a distance matrix M.

Herein, the distance matrix M is composed of all the elements $m_{ij}$, and each element $m_{ij}$ represents the sum of EMD distance between the histograms of any two feature vectors extracted above.

Wherein, EMD (Earth Mover's Distance) is very important for measuring the similarity of two feature distributions. In computer science, Earth Mover's Distance is a measure of the distance between two probability distributions over a region D. In mathematics, this is known as the Wasserstein metric. Informally, if the distributions are interpreted as two different ways of piling up a certain amount of dirt over the region D, the EMD is the minimum cost of turning one pile into the other; where the cost is assumed to be amount of dirt moved times the distance by which it is moved. The above definition is valid only if the two distributions have the same integral (informally, if the two piles have the same amount of dirt), as in normalized histograms or probability density functions. In that case, the EMD is equivalent to the first Mallows distance or first Wasserstein distance between the two distributions.

Step 204, based on the distance matrix M described above, employ Isomap method to obtain the coordinate value on one dimensional manifold for each feature vector, and normalizing it.

Step 205, construct a scalar map.

Wherein, each pixel in the scalar map is corresponding to each point in the down-sampling, and the value at each pixel is the normalized coordinate value of the feature vector.

Step 206, up-sample the scalar map described above to full resolution, which forms a full resolution scalar map used as the progression channel.

Such progression channel is capable to capture the low frequency spatial changes in color, lighting, and local pattern combined.

Figure 7:
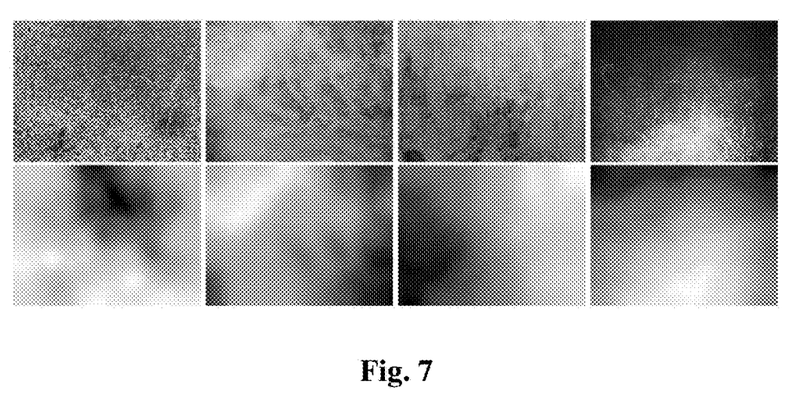
FIG. 7 is a schematic representation of an inhomogeneous texture exemplar and its corresponding progression channel, in accordance with an embodiment of the present invention.

FIG. 7 shows four inhomogeneous texture exemplars and their corresponding progression channels (wherein, 4 inhomogeneous texture exemplars are shown in the top row, and the corresponding progression channels are shown in the bottom row).

Step 207, divide the texture exemplar into non-overlapping patches with default size.

Wherein the default size can be set to 16×16 pixels.

Step 208, compute the feature descriptor of histogram of oriented gradients for each non-overlapping texture patch.

Step 209, convert the feature descriptor of histogram of oriented gradients into a set of orientation vectors.

Step 210, apply PCA dimensionality reduction method to obtain a dominant vector field from the orientation vectors described above, such that the dominant vector field is used as the orientation field of the texture exemplar; wherein the dominant vector refers to the eigen vector corresponding to the largest eigen value.

Wherein, PCA (Principal Component Analysis) is a statistical procedure. It uses an orthogonal transformation to convert a set of observations of possibly correlated variables into a set of values of linearly uncorrelated variables called principal components. Mathematically, PCA is defined as an orthogonal linear transformation that transforms the data to a new coordinate system such that the greatest variance by some projection of the data comes to lie on the first coordinate (called the first principal component), the second greatest variance on the second coordinate (called the second principal component), and so on.

Such orientation field comprised by vectors is capable to represent the local dominant orientations of the texture.

Figure 8:
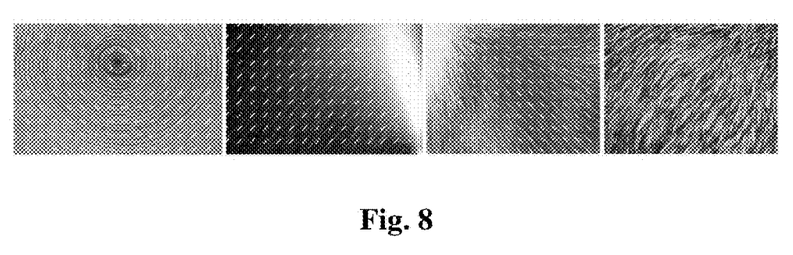
FIG. 8 is a schematic representation of an inhomogeneous texture exemplar and its corresponding orientation field, in accordance with an embodiment of the present invention.

FIG. 8 shows several anisotropic textures as well as the corresponding orientation filed extracted by the method described above.

Step 211, obtain a progression map and an orientation field from the user specified target, which are used as the target guidance channels.

Step 212, compare the differences between the source guidance channels and the target guidance channels, so as to form the progression constraint and orientation constraint.

Specifically, the progression constraint refers to the similarity in progression channel; the orientation constraint refers to the similarity in orientation filed;

Herein step 212 can be achieved by the following manners:

Determining the similarity $d_p(t_i,s_i)$ in progression channel described above according to formula $d_p(t_i,s_i)=\|p(t_i)-p(s_i)\|_1$; wherein $t_i$ is a patch with default size in target image; $s_i$ is the most similar patch in texture exemplar corresponding to $t_i$; $p(t_i)$ is the unfolded vector in progression channel of patch $t_i$; $p(s_i)$ is the unfolded vector in progression channel of patch Determining the similarity $d_o(t_i,s_i)$ in orientation field described above according to formula) $d_o(t_i,s_i)=\Sigma_{x\in s_i, y\in t_i}(1-|v_x \cdot v_y|)$; wherein $v_x$ and $v_y$ are the orientation vectors at pixel x in $s_i$ and pixel y in t respectively.

Step 213, determining the distance measure between the texture exemplar and target image, and adding the progression constraint and orientation constraint into the distance measure.

For example, the distance measure $d(t_i,s_i)$ with constraints added between patches can be determined according to formula $d(t_i,s_i)=\|t_i-s_i\|_2^2+\alpha(\beta d_p(t_i,s_i)+(1-\beta)d_o(t_i,s_i))$; wherein $\alpha$ is a default constraint weight, used to balance between the color difference and the guidance channel difference which in general can be set to 0.9; $\beta$ is a default adjusting weight, used to balance between the target scalar guidance map and the target direction field, which in general can be set to 0.5, for those textures that exhibit both spatial inhomogeneity and local anisotropy.

Step 214, the target image produced by minimizing the sum of distances over all patches with the constrained distance measure, is the final output of controlled synthesis, comprising.

Herein, the sum of distances over all patches with the constrained distance measure can be minimized according to function $T=\min_{\{t_i,s_i\}}\Sigma_{i\in T}d(t_i,s_i)$, and the produced target image is the final output of controlled synthesis.

The following is a concrete result achieved by the above steps 201 through 214:

In the embodiment of the present invention, all the texture analysis programs can be implemented in Matlab software. It takes roughly 60 minutes to extract the source guidance channels from a 600×400 texture exemplar. Most of this time is spent on constructing the matrix of the distances between the feature vectors, which is then provided as input to the Isomap algorithm. Texture synthesis implementation is built upon the available self-tuning texture optimization code. It takes roughly 25 minutes to synthesize a 512×512 texture using the present guided synthesis method. All the times were measured on an Intel Xeon E5-2687W CPU running at 3.4 GHz with 8 GB of RAM.

Figure 9:
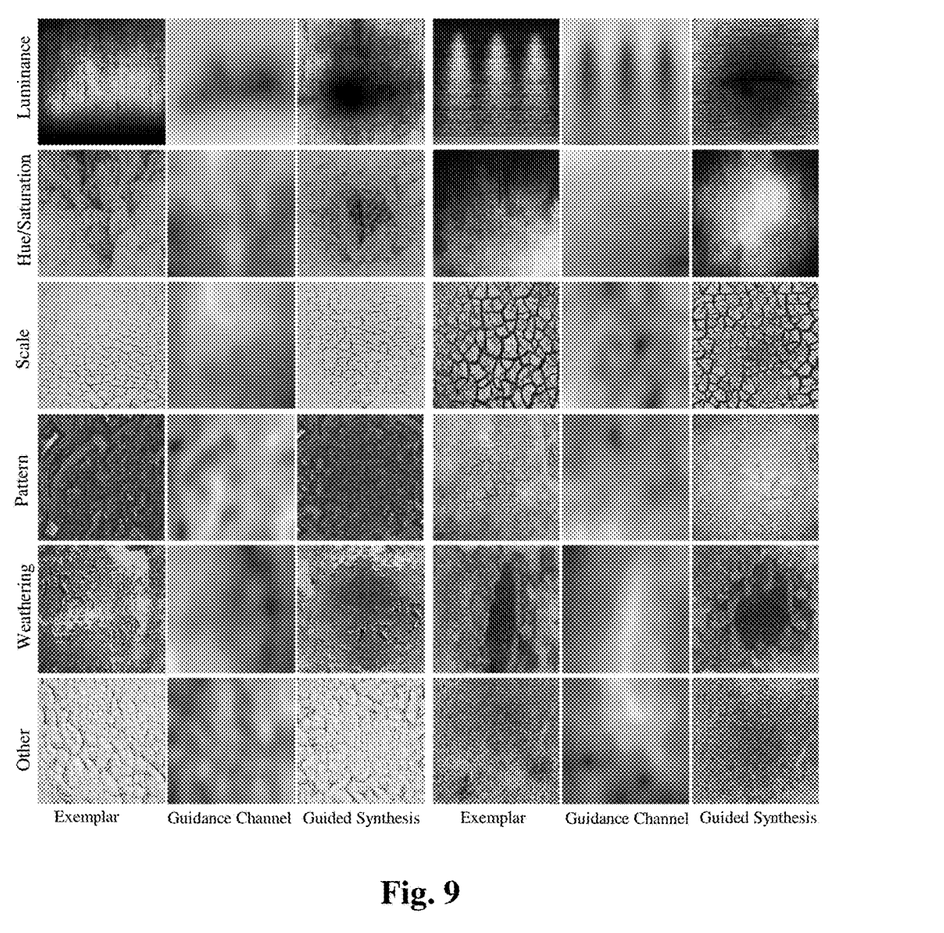
FIG. 9 is a schematic representation of the final output of the controlled texture synthesis, in accordance with an embodiment of the present invention.

FIG. 9 shows a gallery of textures exhibiting significant spatial changes in luminance, hue and/or saturation, scale, and pattern. Next to each exemplar (1st and 4th columns) it is shown the scalar guidance channel extracted by the present analysis (2nd and 5th columns). The textures in this figure are not strongly anisotropic, and the source vector field is therefore not shown. In all of the examples, the target guidance field was a smooth Gaussian bump (or an inverted version of it). The 3rd and 6th columns show the present guided synthesis results, which achieved the expectations.

Figure 10:
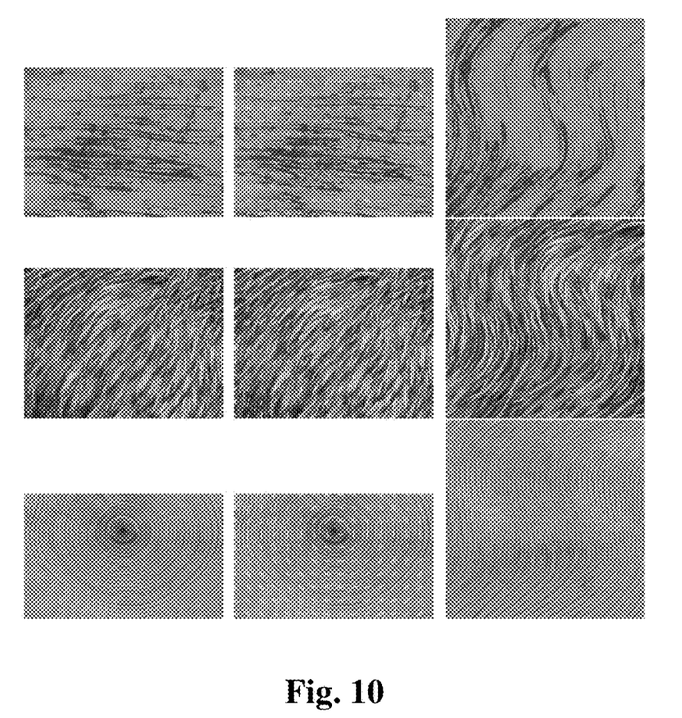
FIG. 10 contains the schematic representations of input texture exemplars, exemplars with orientation field overlaid, and the final output of controlled synthesis with a waved-shaped target orientation field, in accordance with an embodiment of the present invention.

FIG. 10 demonstrates the ability to control local orientation in strongly directional textures. The middle column shows the input exemplar superimposed with the extracted orientation vector field. In this figure only a wave-shaped target vector field is used to control the local orientation, and no scalar guidance channel was used. In FIG. 10, the left column shows the input exemplars, the middle column shows the input exemplar superimposed with the extracted vector field, and the right column shows the results of using a wave-shaped target vector field to guide the synthesis.

Figure 11:
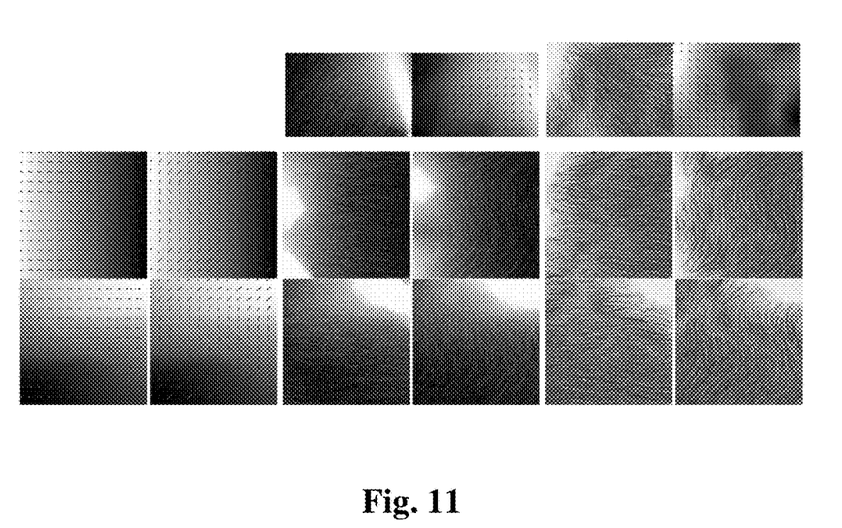
FIG. 11 contains the schematic representations of input texture exemplars and their corresponding guidance channels, and the final output of controlled synthesis with four different target guidance channels, in accordance with an embodiment of the present invention.

FIG. 11 shows that the present invention is capable to control the result using both the scalar guidance channel and the guidance vector field. In order to achieve a specific synthetic effect, different spatially variant properties may be controlled independently and simultaneously with the local orientation. In FIG. 11, the top rows shows the input exemplars and the corresponding source guidance channels, the two rows in the bottom show four different target guidance channels and the corresponding synthesis results.

Figure 12:
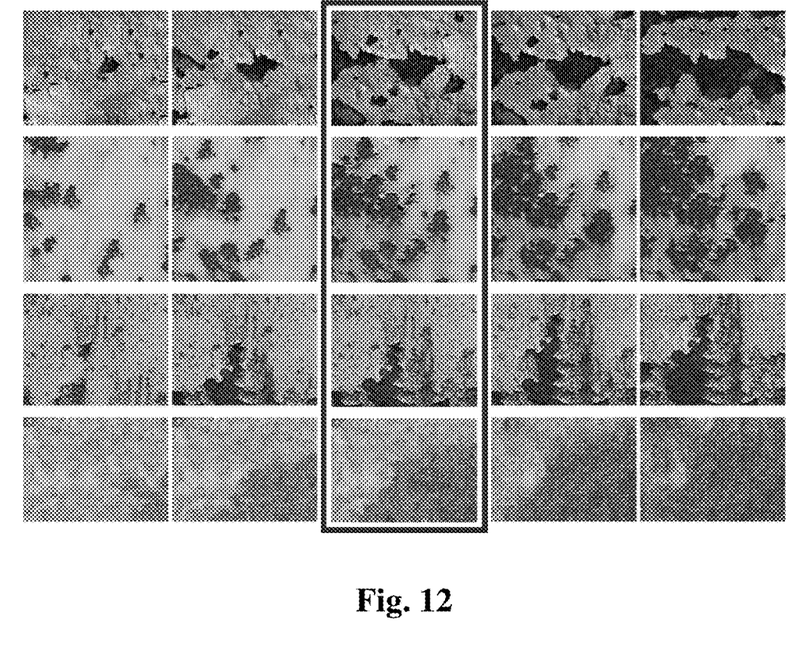
FIG. 12 is a schematic representation of applying to synthesizing time-varying weathering texture sequences, in accordance with an embodiment of the present invention.

Furthermore, the present invention can bring many different applications. For example:

FIG. 12 shows several time-varying weathering texture sequences, where the weathering degree increases from left to right, and the input exemplars are shown in the middle column. The scalar progression channel can typically function as an effective "age map". By providing a suitable target guidance channel the present invention is able to synthesize textures that appear less or more weathered than the original exemplar. First threshold the source guidance channel G to identify a "clean" region of the input texture T. A clean texture $T_c$ is then synthesized using only patches from the clean region (similarly to our dominant texture synthesis described earlier). However, while synthesizing $T_c$, a new guidance channel $G_c$ is also synthesized from the source guidance channel G. Another threshold $t_w$ is used to detect the fully weathered regions of T (areas for which $G<t_w$). Next, a sequence of guidance maps $G_i$ are generated by gradually transitioning from $G_c$ to G, and then continuing to gradually darken those regions of the guidance channel which have not yet reached $t_w$, while freezing the already weathered regions. FIG. 12 demonstrates that synthesizing textures using this sequence of guidance maps can give the users the desired time varying weathering sequence.

Figure 13:
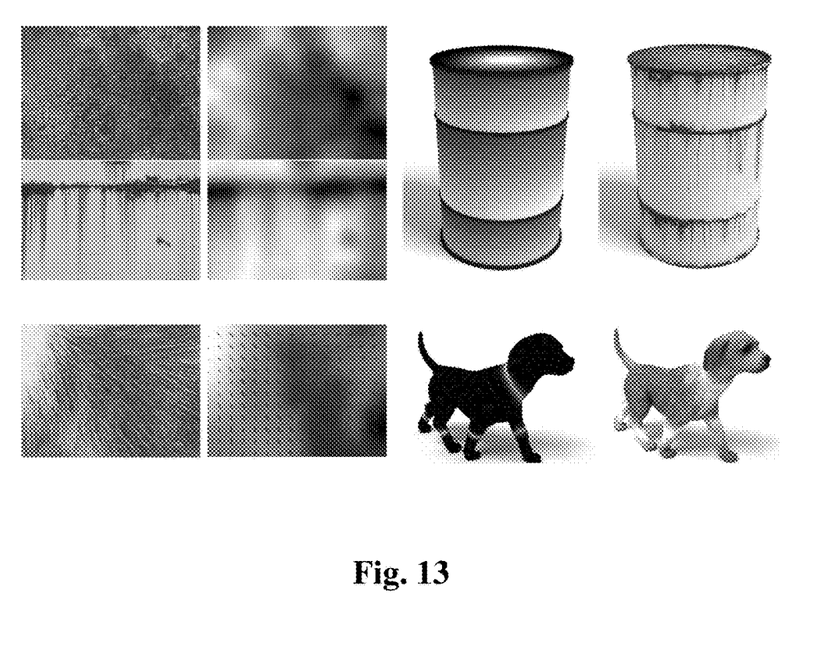
FIG. 13 is a schematic representation of applying to synthesizing textures for specific 3D models, in accordance with an embodiment of the present invention.

FIG. 13 shows two examples of using our technique to synthesize textures targeting specific 3D models. The barrel (top row) is textured using two different rust textures, one for the top and another for the side. The user provided scalar guidance channel is created using several simple gradients. The puppy (bottom row) is textured using a directional texture, whose guidance map consist of a scalar channel and a vector field. The puppy's head is textured using a separately provided texture, while the fur texture over the body is synthesized using our method. The results demonstrates that the control that provided by the present invention is crucial. A UV map was created for each model in 3ds Max, and the user-provided target guidance maps were drawn over these UV maps (in the figure the guidance map is shown texture-mapped onto the model). The scalar channel was created using a few simple gradient fills in Photoshop. The vector field for the puppy example was interpolated from a few user-drawn guiding curves using harmonic Thus, the method for controlled synthesis of inhomogeneous textures provided by the embodiment of the present invention, improves the distance measure in texture optimization, which enables the control of the synthesis result through user provided target guidance channels. Therefore, the present invention overcomes the issue that there's still lack of a method for controlled synthesis of inhomogeneous textures.

Figure 14:
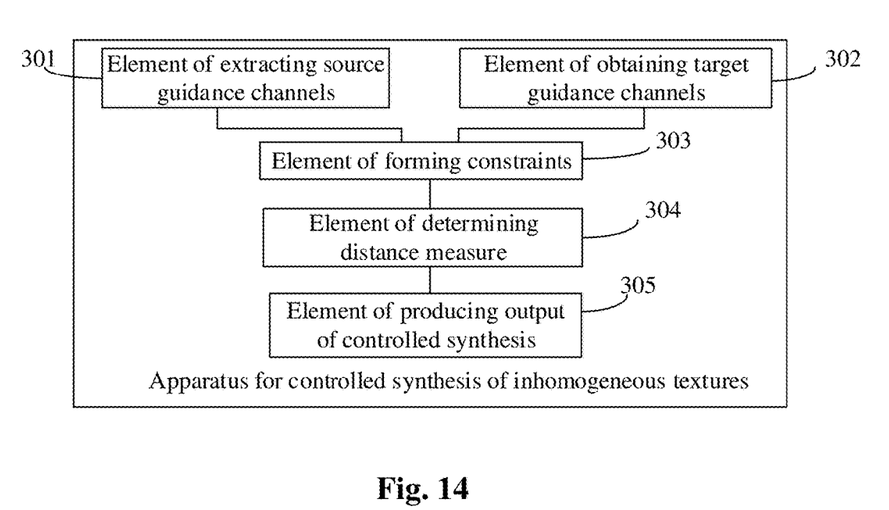
FIG. 14 is schematic structure I of an apparatus for controlled synthesis of inhomogeneous textures, in accordance with an embodiment of the present invention.

As shown in FIG. 14, in accordance with the method embodiments shown in FIGS. 4 and 6 described above, the embodiment of the present invention further provides an apparatus for controlled synthesis of inhomogeneous texture image, comprising:

Element 301, obtaining source guidance channels, which is to obtain an input texture exemplar from user, analyze the features of the exemplar and extract source guidance channels; herein the guidance channels comprise a progression map and an orientation field of the texture exemplar.

Element 302, obtaining target guidance channels, which is to obtain a progression map and an orientation field from the user specified target, and the progression map and the orientation field are used as target guidance channels.

Element 303, forming constraints, which is to compare the differences between the source guidance channels and the target guidance channels, forming the progression constraint and orientation constraint.

Element 304, determining distance measure, which is to determine the distance measure between the texture exemplar and target image, and the progression constraint and orientation constraint are added into the distance measure.

Element 305, producing the output controlled synthesis, which is to produce a target image by minimizing the sum of distances over all patches with the constrained distance measure, wherein the target image is the final output of controlled synthesis.

Figure 15:
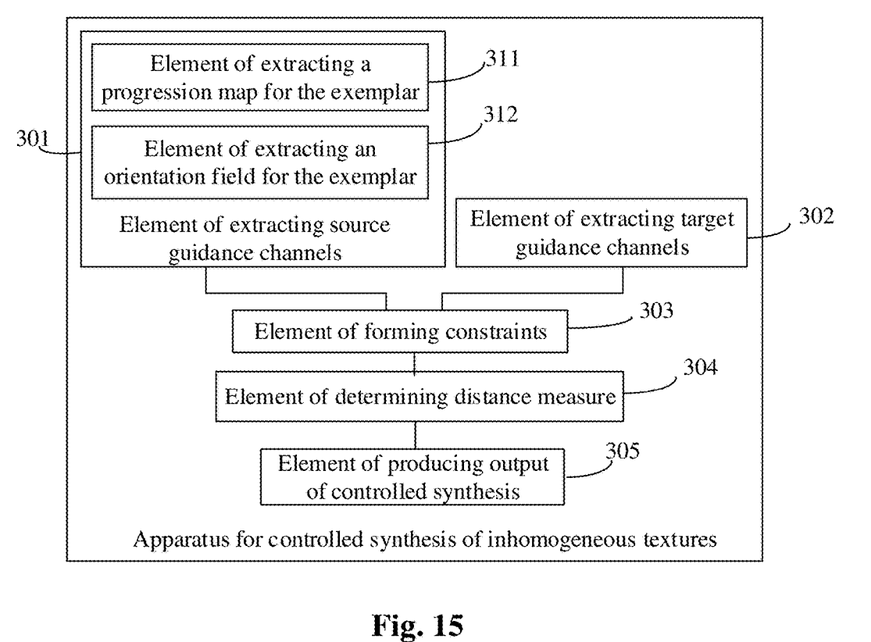
FIG. 15 is schematic structure II of an apparatus for controlled synthesis of inhomogeneous textures, in accordance with an embodiment of the present invention.

Furthermore, as shown in FIG. 15, the described element 301, obtaining source guidance channels, includes elements 311, extracting a progression map for the exemplar, which is used for:

Analyzing the features of the texture exemplar, and extracting a progression map.

Elements 311, extracting a progression map for the exemplar, is specifically used for:

Down-sampling the texture exemplar with a default sampling interval and a default sampling window, and computing a feature vector inside each default sampling window;

Constructing a distance matrix M; herein the distance matrix M is composed of all the elements $m_{ij}$, and each element $m_{ij}$ represents the sum of EMD distance between the histograms of two feature vectors among all the feature vectors described above;

Based on the distance matrix M described above, employing Isomap method to obtain the coordinate value on one dimensional manifold for each feature vector, and normalizing it.

Constructing a scalar map; wherein each pixel in the scalar map is corresponding to each point in the down-sampling, and the value at each pixel is the normalized coordinate value of the feature vector.

Up-sampling the scalar map described above to full resolution, which forms a full resolution scalar map using as the progression channel.

Furthermore, the described element 301, obtaining source guidance channels, includes elements 312, extracting an orientation field for the exemplar, which is used for:

Analyzing the features of the texture exemplar, so as to extract an orientation field for the input texture exemplar.

Element 312, extracting an orientation field for the exemplar, is specifically used for:

Dividing the texture exemplar into non-overlapping patches with default size;

Computing the feature descriptor of histogram of oriented gradients for each non-overlapping texture patch;

Converting the feature descriptor of histogram of oriented gradients into a set of orientation vectors;

Applying PCA dimensionality reduction method to obtain a dominant vector field from the orientation vectors described above, and the dominant vector field is used as the orientation field of the texture exemplar; wherein the dominant vector refers to the eigen vector corresponding to the largest eigen value.

Furthermore, in the described element 303, forming constraints, the progression constraint refers to the similarity in progression channel; the orientation constraint refers to the similarity in orientation filed.

Element 303, forming constraints, is specifically used for:

Determining the similarity $d_p(t_i,s_i)$ in progression channel described above according to formula $d_p(t_i,s_i)=\|p(t_i)-p(s_i)\|_1$; wherein $t_i$ is a patch with default size in target image; $s_i$ is the most similar patch in texture exemplar corresponding to $t_i$; $p(t_i)$ is the unfolded vector in progression channel of patch $t_i$; $p(s_i)$ is the unfolded vector in progression channel of patch $s_i$.

Determining the similarity $d_o(t_i,s_i)$ in orientation field described above according to formula $d_o(t_i,s_i)=\Sigma_{x\in s_i,y\in t_i}(1-|v_x\cdot v_y|)$; wherein $v_y$ and $v_y$ are the orientation vectors at pixel x in $s_i$ and pixel y in t respectively.

Furthermore, the described element 304, determining distance measure, is specifically used for:

Determining the distance measure $d(t_i,s_i)$ between patches after adding constraints according to formula $d(t_i,s_i)=\|t_i-s_i\|_2^2+\alpha(\beta d_p(t_i,s_i)+(1-\beta)d_o(t_i,s_i))$; here $\alpha$ is a default constraint weight; $\beta$ is a default adjusting weight.

Furthermore, the described element 305, producing the output controlled synthesis, is specifically used for:

Producing the target image by minimizing the sum of distances over all patches with the constrained distance measure according to function $T=\min_{\{t_i,s_i\}}\Sigma_{i\in T}d(t_i,s_i)$, where the target image is the final output of controlled synthesis.

Furthermore, the embodiment of the present invention provides a computer-readable storage medium including computer readable instructions, the computer readable instructions are executed to enable the processor to perform at least one of the methods for controlled synthesis of inhomogeneous textures described in FIGS. 4 and 6 described above.

Figure 16:
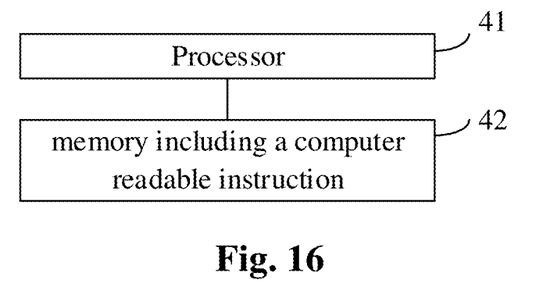
FIG. 16 is the schematic structure of a device, in accordance with an embodiment of the present invention.

Furthermore, the embodiment of the present invention also provides a device, comprising: processor 41; and memory 42 including computer readable instructions, which enable the processor to execute at least one of the methods for controlled synthesis of inhomogeneous textures described in FIGS. 4 and 6 described above.

In summary, the embodiment of the present invention first obtains an input texture exemplar from user, and analyzes the features of the exemplar, so as to extract the source guidance channels; herein the guidance channels comprise a progression map and an orientation field of the texture exemplar; then obtains a progression map and an orientation field from the user specified target, which are used as the target guidance channels; by comparing the differences between the source guidance channels and the target guidance channels, it forms the progression constraint and orientation constraint; after determining the distance measure between the texture exemplar and target image, it adds the progression constraint and orientation constraint into the distance measure;

and accordingly, the target image produced by minimizing the sum of distances over all patches with the constrained distance measure, is the final output of controlled synthesis. The embodiment of the invention improves the distance measure in texture optimization, which enables the control of the synthesis result through user provided target guidance channels. Therefore, the present invention overcomes the issue that there's still lack of a method for controlled synthesis of inhomogeneous textures.

It will be appreciated by those persons skilled in the art that embodiments of the present invention may be provided as a method, system, or computer program product. Thus, the present invention may take the form of a complete hardware embodiment, a complete software embodiment, or a combination of software and hardware aspects. Moreover, the present invention may take the form of a computer program product implemented in one or more computer usable storage media (including but not limited to disk storage, CD-ROM, optical memory, etc.) in which computer usable program code is included.

The present invention has been these computer program instructions may also be stored in a computer readable memory capable of operating a computer or other programmable data processing device in a particular manner such that instructions stored in the computer readable memory produce a product that includes a command device, The device implements a function specified in a flowchart or a flowchart and/or block diagram of a block or boxes.

These computer program instructions may also be loaded onto a computer or other programmable data processing device such that a series of operational steps are performed on a computer or other programmable device to produce computer-implemented processing that is performed on a computer or other programmable device. The instructions provide steps for implementing the functions specified in one or more of the flowcharts or flowcharts and/or block diagrams in the flowchart.

These computer program instructions can also be loaded onto the computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The principles and embodiments of the present invention have been described with reference to specific embodiments of the present invention, and the description of the above embodiments is merely for the purpose of understanding the method and the core idea of the present invention. Meanwhile, for those skilled in the art, the present invention is not to be construed as limiting the scope of the invention.

The invention claimed is:

1. A method for a controlled synthesis of inhomogeneous textures, implemented by a processor and a non-transitory computer-readable storage medium having instructions stored therein such that when executed, the processor performs:
    obtaining an input texture exemplar from a user;
    analyzing features of the input texture exemplar to extract source guidance channels, the source guidance channels comprising a progression map and an orientation field of the input texture exemplar;
    obtaining a progression map and an orientation field from a user specified target, which are used as target guidance channels;
    comparing differences between the source guidance channels and the target guidance channels to form a progression constraint and an orientation constraint;
    determining a distance measure between the input texture exemplar and a target image;
    adding the progression constraint and the orientation constraint to the distance measure to generate a constrained distance measure; and
    producing the target image by minimizing a sum of distances over all patches with the constrained distance measure as a final output of the controlled synthesis.

2. The method for controlled synthesis of inhomogeneous textures according to claim 1, is characterized in that, the analyzing the features of the input texture exemplar to extract the source guidance channels comprises:
    analyzing the features of the input texture exemplar to extract a progression map;
    wherein the analyzing the features of the input texture exemplar to extract the progression map comprises:
    down-sampling the input texture exemplar with a default sampling interval and a default sampling window;
    computing a feature vector inside each of the default sampling window;
    constructing a distance matrix M, the distance matrix M being composed of elements $m_{ij}$, each element $m_{ij}$ representing a sum of an EMD (earth moving distance) between histograms of any two of the feature vectors;
    based on the distance matrix M, employing an Isomap method to obtain a coordinate value on a one dimensional manifold for each of the feature vectors, and normalizing the coordinate value;
    constructing a scalar map, wherein each pixel in the scalar map is corresponding to each point in the down-sampling, and a value at each pixel is the normalized coordinate value of the feature vectors; and
    up-sampling the scalar map to a full resolution to form a full resolution scalar map used as a progression channel.

3. The method for controlled synthesis of inhomogeneous textures according to claim 2, is characterized in that, the analyzing the features of the input texture exemplar to extract source guidance channels comprises:
    analyzing the features of the input texture exemplar to extract an orientation field;
    wherein the analyzing the features of the input texture exemplar to extract the orientation field comprises:
    dividing the input texture exemplar into non-overlapping texture patches with a default size;
    computing a feature descriptor of a histogram of oriented gradients for each of the non-overlapping texture patches;
    converting the feature descriptor of the histogram of oriented gradients into a set of orientation vectors; and
    applying a PCA (principal component analysis) dimensionality reduction method to obtain a dominant vector field from the set of orientation vectors, such that the dominant vector field is used as the orientation field of the input texture exemplar, wherein the dominant vector field refers to an eigen vector corresponding to a largest eigen value.

4. The method for controlled synthesis of inhomogeneous textures according to claim 3, is characterized in that, the progression constraint refers to a similarity in the progression channel, and the orientation constraint refers to a similarity in the orientation filed;
    wherein the comparing the differences between the source guidance channels and the target guidance channels to form the progression constraint and the orientation constraint comprises:
    determining a similarity $d_p(t_i,s_i)$ in the progression channel according to formula $d_p(t_i,s_i)=\|p(t_i)-p(s_i)\|_1$; wherein $t_i$ is a patch with a default size in the target image; $s_i$ is a most similar patch in the input texture exemplar corresponding to $t_i$; $p(t_i)$ is an unfolded vector in a progression channel of the patch $t_i$; and $p(s_i)$ is an unfolded vector in a progression channel of a patch $s_i$; and
    determining a similarity $d_o(t_i,s_i)$ in the orientation field according to formula $d_o(t_i,s_i)=\Sigma_{x\in s_i,y\in t_i}(1-|v_x \Box v_y|)$; wherein $v_x$ and $v_y$ are orientation vectors at a pixel x in the patch $s_i$ and a pixel y in the patch $t_i$ respectively.

5. The method for controlled synthesis of inhomogeneous textures according to claim 4, is characterized in that, the determining the distance measure between the input texture exemplar and the target image, and adding the progression constraint and the orientation constraint into the distance measure, comprises:
    determining a distance measure $d(t_i,s_i)$ between patches after adding constraints according to formula $d(t_i,s_i)=\|t_i-s_i\|+\alpha(\beta d_p(t_i,s_i)+(1-\beta)d_o(t_i,s_i))$; where $\alpha$ is a default constraint weight; and $\beta$ is a default adjusting weight.

6. The method for controlled synthesis of inhomogeneous textures according to claim 4, is characterized in that, the target image produced by minimizing the sum of the distances over all the patches with the constrained distance measured as the final output of the controlled synthesis comprises:

producing the target image by minimizing the sum of the distances over all the patches with the constrained distance measure according to a function $T=\min_{\{t_i,s_i\}}\Sigma_{i\in T}d(t_i,s_1)$, as the final output of the controlled synthesis.

7. The non-transitory computer-readable storage medium of claim 1 including the instructions, is characterized in that, the instructions are executed to enable the processor to perform the method of claim 1.

8. A device, comprising:
the processor; and a memory including the instructions, which enable the processor to execute the method of claim 1.

9. An apparatus for a controlled synthesis of inhomogeneous textures, comprising:
a processor and a non-transitory computer readable storage medium having instructions stored therein, wherein the instructions configure the processor to:
obtain an input texture exemplar from a user;
analyze features of the input texture exemplar and extract source guidance channels, the source guidance channels comprising a progression map and an orientation field of the input texture exemplar;
obtain a progression map and an orientation field from a user specified target, wherein the progression map and the orientation field are used as target guidance channels;
compare differences between the source guidance channels and the target guidance channels to form a progression constraint and an orientation constraint;
determine a distance measure between the input texture exemplar and a target image;
add the progression constraint and the orientation constraint to the distance measure to generate a constrained distance measure; and
produce the target image by minimizing a sum of distances over all patches with the constrained distance measure, wherein the target image is a final output of the controlled synthesis.

10. The apparatus for controlled synthesis of inhomogeneous textures according to claim 9, is characterized in that, to analyze the features of the input texture exemplar and to extract the source guidance channels, the instructions configure the processor to:
analyze the features of the input texture exemplar, and to extract progression map;
wherein, to analyze the features of the input texture exemplar and to extract the progression map, the instructions further configure the processor to:
down sample the input texture exemplar with a default sampling interval and a default sampling window;
compute a feature vector inside each of the default sampling window;
construct a distance matrix M, the distance matrix M being composed of elements $m_{ij}$, wherein each element $m_{ij}$ represents a sum of an EMD (earth moving distance) between histograms of any two of the feature vectors;
based on the distance matrix M, employ an Isomap method to obtain a coordinate value on a one dimensional manifold for each of the feature vectors, and normalize the coordinate value;

construct a scalar map, wherein each pixel in the scalar map is corresponding to each point in the downsampling, and a value at each pixel is the normalized coordinate value of the feature vectors; and
up sample the scalar map to a full resolution to form a full resolution scalar map using as a progression channel.

11. The apparatus for controlled synthesis of inhomogeneous textures according to claim 10, is characterized in that, to analyze the features of the input texture exemplar and to extract source guidance channels, the instructions configure the processor to:
analyze the features of the input texture exemplar to extract an orientation field;
wherein, to analyze the features of the input texture exemplar and to extract orientation field, the instructions further configure the processor to:
divide the input texture exemplar into non-overlapping texture patches with a default size;
compute a feature descriptor of a histogram of oriented gradients for each of the non-overlapping texture patches;
convert the feature descriptor of the histogram of oriented gradients into a set of orientation vectors; and
apply a PCA (principal component analysis) dimensionality reduction method to obtain a dominant vector field from the set of orientation vectors, wherein the dominant vector field is used as the orientation field of the input texture exemplar, and wherein the dominant vector field refers to an eigen vector corresponding to a largest eigen value.

12. The apparatus for controlled synthesis of inhomogeneous textures according to claim 11, is characterized in that, the progression constraint refers to a similarity in the progression channel, and the orientation constraint refers to a similarity in the orientation field;
wherein, to compare the differences between the source guidance channels and the target guidance channels, and to form the progression constraint and the orientation constraint, the instructions further configure the processor to:
determine a similarity $d_p(t_i,s_i)$ in the progression channel according to formula $d_p(t_i,s_i)=\|p(t_i)-p(s_i)\|_1$; wherein $t_i$ is a patch with a default size in the target image; $s_i$ is a most similar patch in the input texture exemplar corresponding to $t_i$; $p(t_i)$ is an unfolded vector in a progression channel of the patch $t_i$; and $p(s_i)$ is an unfolded vector in a progression channel of a patch $s_i$; and
determine a similarity $d_o(t_i,s_i)$ in the orientation field according to formula $d_o(t_i,s_i)=\Sigma_{x\in s_i,y\in t_i}(1-|v_x\Box v_y|)$; wherein $v_x$ and $v_y$ are orientation vectors at a pixel x in the patch $s_i$ and a pixel y in the patch $t_i$ respectively.

13. The apparatus for controlled synthesis of inhomogeneous textures according to claim 12, is characterized in that, to determine the distance measure between the input texture exemplar and the target image, and to add the progression constraint and the orientation constraint to the distance measure, the instructions further configure the processor to:
determine a distance measure $d(t_i,s_i)$ between patches after adding constraints according to formula $d(t_i,s_i)=\|t_i-s_i\|+\alpha(\beta d_p(t_i,s_i)+(1-\beta)d_o(t_i,s_i))$; where $\alpha$ is a default constraint weight; and $\beta$ is a default adjusting weight.

14. The apparatus for controlled synthesis of inhomogeneous textures according to claim 13, is characterized in that, to produce the target image by minimizing the sum of the distances over all the patches with the constrained distance measure, wherein the target image is the final output of controlled synthesis, the instructions further configure the processor to:

produce the target image by minimizing the sum of the distances over all the patches with the constrained distance measure according to a function $T = \min_{\{t_i, s_i\}} \Sigma_{i \in T} d(t_i, s_i)$, where the target image is the final output of controlled synthesis.

* * * * *